(12) United States Patent
Chen et al.

(10) Patent No.: US 6,445,734 B1
(45) Date of Patent: Sep. 3, 2002

(54) SYSTEM AND METHOD OF VALIDATING EQUALIZER TRAINING

(75) Inventors: Li Chen; Farhad Aminian, both of Irvine; Keith T. Chu, Laguna Niguel, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/343,873

(22) Filed: Jun. 30, 1999

(51) Int. Cl.$^7$ ................................................ H03H 7/30
(52) U.S. Cl. ........................ 375/231; 375/232; 375/350; 708/305; 708/323
(58) Field of Search ................................ 375/229–232, 375/346, 348, 350, 222; 708/322, 323, 305

(56) References Cited

U.S. PATENT DOCUMENTS

| 4,539,689 A | | 9/1985 | Chiu et al. ..................... 375/13 |
|---|---|---|---|
| 5,297,165 A | * | 3/1994 | Ueda et al. .................... 375/12 |
| 5,550,862 A | * | 8/1996 | Olafsson ....................... 375/229 |
| 5,615,233 A | * | 3/1997 | Baum et al. ................. 375/350 |
| 5,777,910 A | * | 7/1998 | Lu .......................... 364/724.2 |
| 5,864,545 A | | 1/1999 | Gonikberg et al. ......... 370/286 |
| 6,259,729 B1 | * | 7/2001 | Seki ........................... 375/231 |

OTHER PUBLICATIONS

*Adaptive Equalization*, Shahid U.H. Qureshi, Senior Member, IEEE, ©1985, pp. 1349–1387.
*V.34 Recommendation, Series V: Data Communication Over the Telephone Network*, International Telecommunication Union, Feb. 1998, 1–72.
*A Short Introduction to Adaptive Equalization*, Claes Tidestav, Apr. 1998.

*Convergence and Steady–State Behavior of a Phase–Splitting Fractionally Spaced Equalizer*, Fuyun Ling, Senior Member, IFEE, and Shahid U.H. Qureshi, Fellow, IEEE, ©1990 IEEE.

* cited by examiner

Primary Examiner—Stephen Chin
Assistant Examiner—Dac V. Ha
(74) Attorney, Agent, or Firm—Akin, Gump, Strauss, Hauer & Feld, L.L.P.

(57) ABSTRACT

Equalizer training is validated by techniques to detect false training. The validation techniques involve checking the unique time domain energy shaping of a plurality of taps of a trained equalizer of a modem for good training. The energy measure for each equalizer tap of the plurality of taps is approximated by summing the magnitude of a real component and a magnitude of an imaginary component of an equalizer coefficient corresponding to the equalizer tap. A tap with a highest approximate energy (i.e., the main tap) is then determined. Next, the main tap energy is compared to a main tap threshold and a predetermined guarding threshold. The plurality of taps are arranged in a time index ordered sequence. In determining the main tap threshold, a first energy sum of a beginning set of taps in the sequence is compared with a second energy sum of a last set of taps in the sequence. The lesser tap energy sum between the first energy sum and the second energy sum is the main tap threshold. The main tap is then compared with the main tap threshold and the predetermined guarding threshold. If the main tap is greater than the main tap threshold and the predetermined guarding threshold, then the train of the equalizer is good. If the main tap is less than the main tap threshold or the predetermined guarding threshold, then the train of the equalizer is false. The above-mentioned validation techniques are effective to recognize the unique time domain energy shaping characteristics of good-trained equalizer taps.

21 Claims, 4 Drawing Sheets

SYSTEM AND METHOD OF VALIDATING EQUALIZER TRAINING

BACKGROUND

1. Field of the Invention

The present invention relates to a system and method of validating equalizer training.

2. Description of the Related Art

Modems are communications devices, which employ digital modulation techniques to transmit binary data over analog band-limited communications channels. A source modem collects an integral number of bits of data at a time and encodes the bits into symbols for transmission at a signaling rate. In bandwidth-efficient digital communications systems, the effect of each symbol transmitted over a time-dispersive channel has extended beyond the time interval used to represent that symbol. The channel distortion caused by the resulting overlap of received symbols is termed intersymbol interference.

Intersymbol interference has typically been compensated through channel equalization by an equalizer of a receiving modem. The equalizer is traditionally a finite impulse response (FIR), or transversal, equalizer based on a time-varying impulse response of the communications channel. The equalizer is also commonly a least mean-square (LMS) equalizer configured to minimize mean square error (MSE)—the sum of squares of the intersymbol interference terms plus the noise power at the output of the equalizer.

Equalization has typically involved an equalizer training sequence. A training sequence or train is an initial known burst of a symbol stream transmitted over the communications channel. Based on the training sequence, a training algorithm ideally converges the coefficients (or tap gains) of the equalizer to optimally compensate for channel distortion. In some cases, external tone tampering or signal dropout during training will corrupt the training sequence and, thus, the algorithm will falsely converge the equalizer coefficients to bogus values. This is termed false equalizer training. A primary channel of a modem typically crashes as a result of false equalizer training.

SUMMARY OF THE INVENTION

Briefly, false training may be detected by techniques to validate equalizer training. The validation techniques involve checking the unique time domain energy shaping of a plurality of taps of a trained equalizer of a modem for good training. The energy measure for each equalizer tap of the plurality of taps is approximated by summing the magnitude of a real component and a magnitude of an imaginary component of an equalizer coefficient corresponding to the equalizer tap. A tap with a highest approximate energy (i.e., the main tap) is then determined. Next, the main tap energy is compared to a main tap threshold and a predetermined guarding threshold. The plurality of taps are arranged in a time index ordered sequence. In determining the main tap threshold, a first energy sum of a beginning set of taps in the sequence is compared with a second energy sum of a last set of taps in the sequence. The lesser tap energy sum between the first energy sum and the second energy sum is the main tap threshold. The main tap is then compared with the main tap threshold and the predetermined guarding threshold. If the main tap is greater than the main tap threshold and the predetermined guarding threshold, then the train of the equalizer is good. If the main tap is less than the main tap threshold or the predetermined guarding threshold, then the train of the equalizer is false. The above-mentioned validation techniques are effective to recognize the unique time domain energy shaping characteristics of good-trained equalizer taps.

An approach to implementing the validation techniques is through software executed by a data pump of the modem; an application of the validation techniques is to improve V.34 half-duplex Phase 3 equalizer training; and an advantage of the validation techniques is a reduction of a likelihood of channel crashes.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
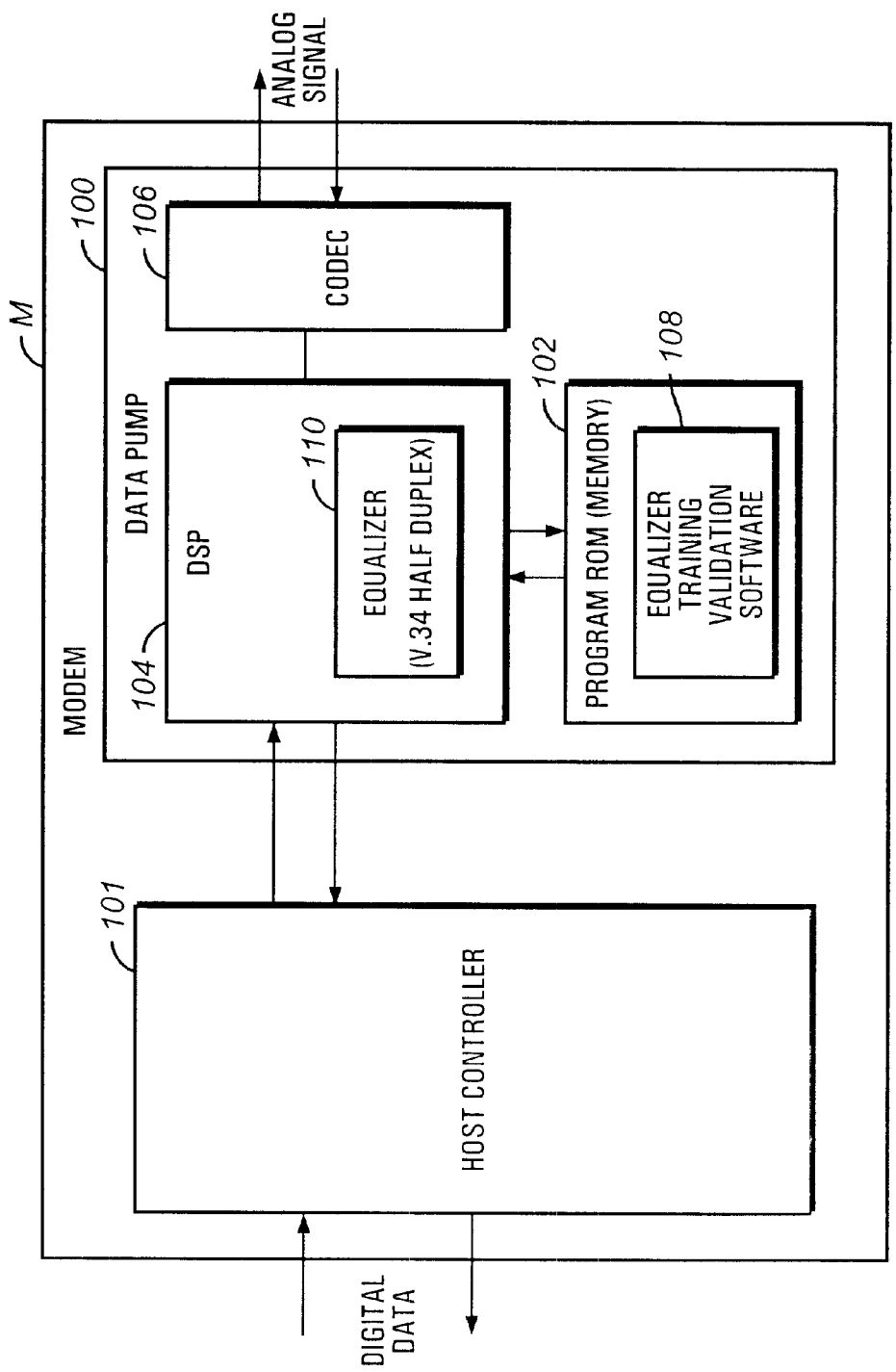
FIG. 1 is a block diagram of an exemplary modem including a data pump having equalizer training validation software and an equalizer.

Turning now to the drawings, FIG. 1 shows components of a modem (modulator-demodulator) M for use in connection with equalizer training validation techniques according to the present invention. Certain typical components of a modem have been omitted for sake of clarity. The modem M, when acting as a destination modem, can receive analog signals propagated across a telephone network through a communications channel. Such signals typically experience channel distortion, a common concern in modem communications, which is partly due to the varying characteristics of the particular communications channel. The modem M provides an adaptive equalizer 110 to compensate for channel distortion. Design and operation of adaptive equalizers are understood in the art. The equalizer 110 can be a finite impulse response (FIR), or transversal, equalizer based on a time-varying impulse response of the communications channel. Alternatively, the equalizer 110 can be implemented in a variety of other conventional ways (hardware or software). The equalizer 110, for example, might be a V.34 half-duplex equalizer. It should be apparent that the communications channel also can be implemented in a number of ways (e.g., telephone channels, radio channels, or undersea channels).

So that the equalizer 110 can suitably adapt to channel distortion, the equalizer 110 is trained by an equalizer training sequence also known as a train. The train is provided to the modem M (in its role as a destination modem) by a source or originating modem. The train may be classified based on its number of constellation points. For example, the train might be a 4-point train or a 16-point train. If the trained equalizer adequately compensates for channel distortion, then the train is considered a good train. If the trained equalizer does not adequately compensate for channel distortion, then the train is considered a false train. False training is commonly attributed to signal dropout or external tone tampering during training. If the train turns out to be a false train, then a retrain can be initiated. For a modem such as a V.34 half-duplex fax modem, equalizer training occurs during Phase 3 of the modem start-up procedure.

A data pump 100 is shown including a digital signal processor (DSP) 104 and a coder-decoder (CODEC) 106. The equalizer 110 is part of the DSP 104. Among other things, the DSP 104 converts digital data from a host controller 101 of the modem M into a digitized analog waveform provided to the CODEC 106, and the CODEC 106 converts analog data to digital data. The DSP 104 and the CODEC 106 cooperate in a conventional manner. Design and operation of data pumps are understood in the art.

The modem M can represent a variety of modems, including a V.34 half-duplex fax modem, for example. It should be understood that the particular modem architecture represented by FIG. 1 is illustrative and not exhaustive. Also, it should be appreciated by those skilled in the art that modems can be implemented in a variety of ways (e.g., PC card or modem box; half-duplex or full-duplex; and fax modem or cable modem).

A memory device 102, shown coupled to the DSP 104, is readable by the DSP 104 such that the DSP 104 executes code stored in the memory device 102. The memory device 102, which can be a program read-only memory, for example, stores equalization training validation software 108 to validate training of the equalizer 110. Equalization training validation techniques, which can be embodied in the equalization training validation software 108, are described below in connection with FIGS. 2–4. It should be appreciated that the equalization training validation techniques are not limited to a specific implementation of the equalization training validation software 108. While the equalization training validation software 108 is shown in the context of a modem in FIG. 1, it should be understood that the equalization training validation techniques are applicable to other communications systems and devices which support an equalizer. Further, in the place of equalizer hardware 110, equalization can be accomplished through equalization code stored in the memory device 102 for execution by the DSP 104. Also, as shown, the memory device 110, data pump 100, and equalizer 110 can be provided on a single integrated circuit or chip.

Figure 2:
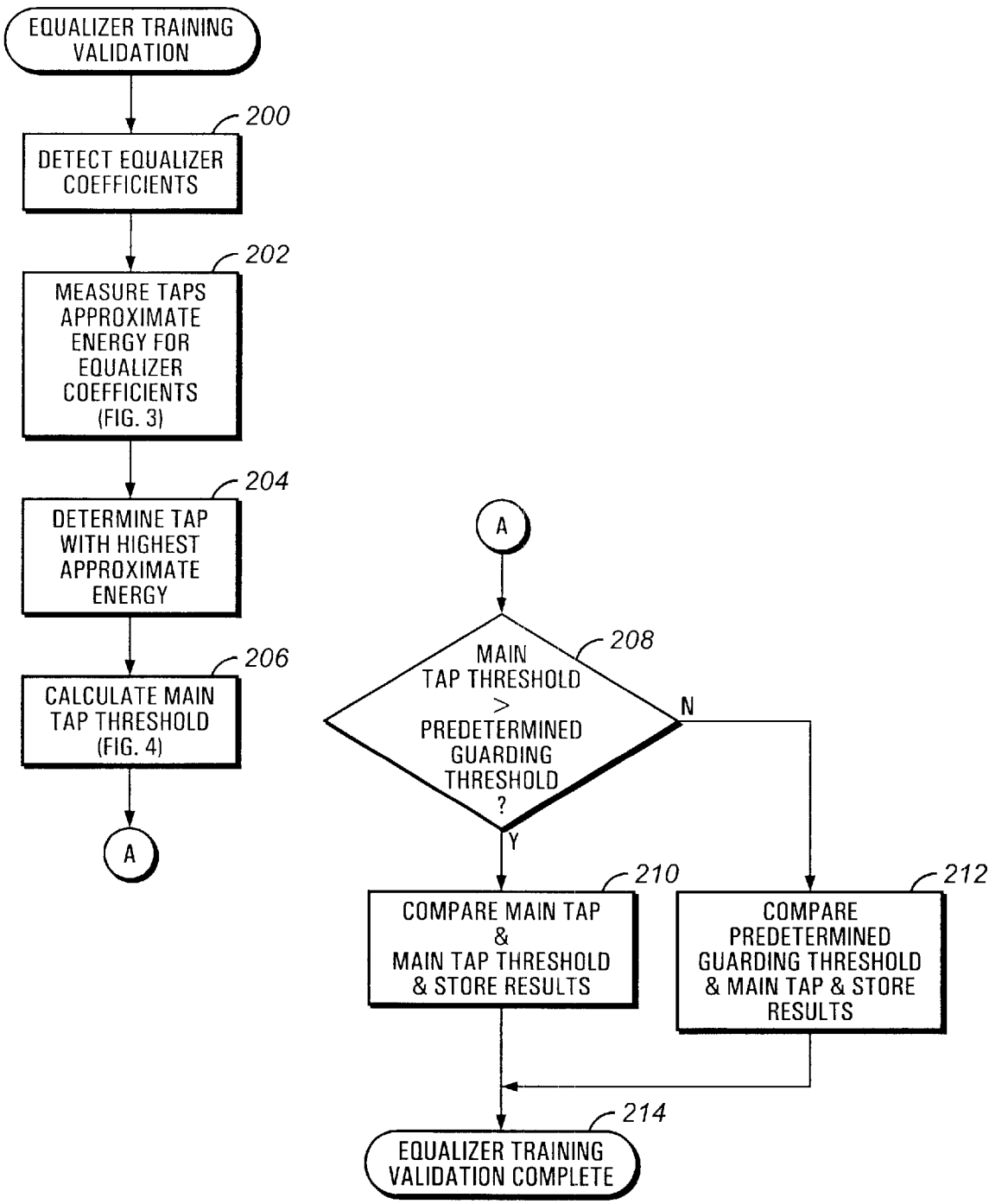
FIG. 2 is a flow chart of an exemplary equalizer training validation technique in accordance with the equalizer training validation software of FIG. 1.
Figure 4:
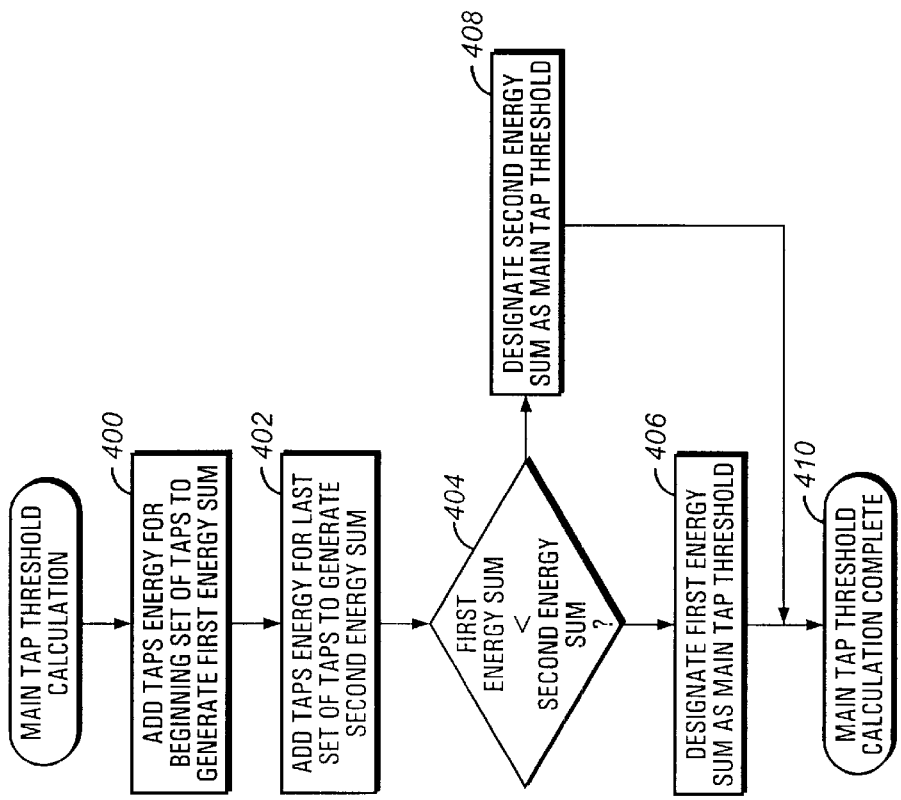
FIG. 4 is a flow chart of a main tap threshold calculation technique in accordance with the equalizer training validation technique of FIG. 2.
Figure 3:
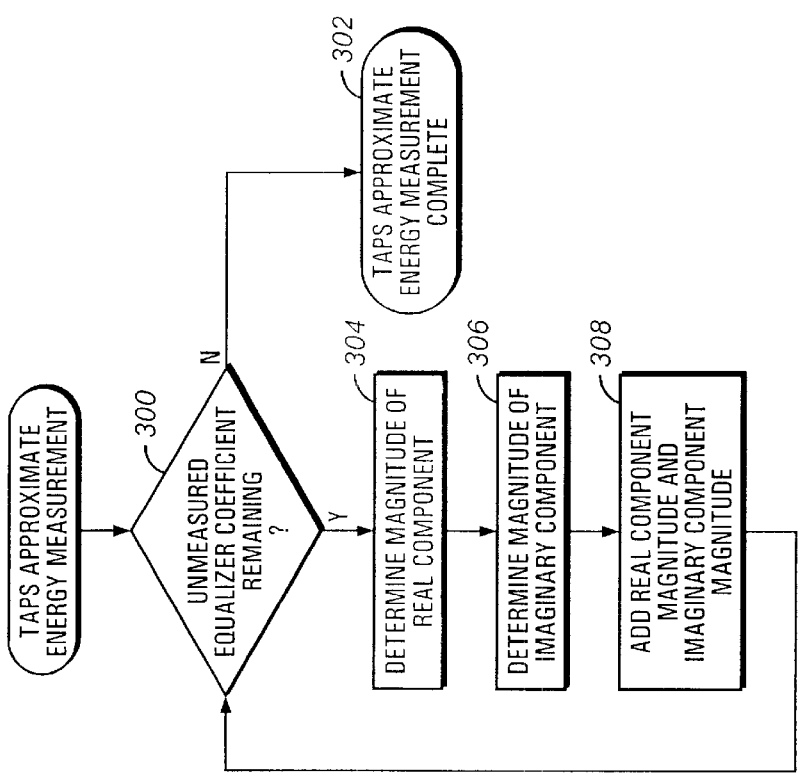
FIG. 3 is a flow chart of an exemplary taps approximate energy measurement technique in accordance with the equalizer training validation technique of FIG. 2.

FIGS. 2–4 represent exemplary underlying operation of the equalization training validation software 108. Referring to FIG. 2, an exemplary equalization training validation technique performed by the DSP 104 through execution of the equalization training validation software or firmware 108 is shown. The technique begins with step 200 where the equalizer coefficients are detected. Next, in step 202, taps approximate energy is measured for the equalizer coefficients.

Referring to FIG. 3, an exemplary taps approximate energy measurement technique is shown. The equalizer 110 is associated with a number of equalizer taps (e.g., 40 taps) corresponding to complex equalizer coefficients. A complex equalizer coefficient can be represented as $C_n = X_n + jY_n$. Beginning in step 300, it is determined if an unmeasured equalizer coefficient is present. If there is an unmeasured equalizer coefficient remaining, then control proceeds to step 304 where the magnitude of the real component of the particular equalizer coefficient is determined. Next, in step 306, the magnitude of the ideal component of the particular equalizer coefficient is determined. From step 306, control proceeds to step 308 where the real component magnitude and the imaginary component magnitude of the particular equalizer coefficient are summed. Steps 304–308 are represented by the following equation:

$$E_{approx} = |X_n| + |Y_n|.$$

In the above equation, $X_n$ represents the real component of an equalizer coefficient, and $Y_n$ represents the imaginary component of the equalizer coefficient. $|X_n| + |Y_n|$ represents the approximate energy for a particular equalizer coefficient, and $E_{approx}$ represents the approximate energy for the particular equalizer coefficient. The actual energy measure for an equalizer coefficient would involve the following equation:

$$E_{actual} = |Cn| = SQRT[|X_n|^2 + |Y_n|^2].$$

For an equalizer coefficient, the actual energy ($|C_n|$) is the square root of the sum of the magnitude of the real component squared ($|X_n|^2$) and the magnitude of the imaginary component squared ($|Y_n|^2$). This conventional calculation would likely involve both more memory and more time than the calculation of the taps approximate energy measurement described above. While the conventional taps energy measurement approach involves two multiplication operations, an addition operation, and a square root operation for each equalizer coefficient, the taps approximate energy measurement approach involves only an addition operation for each equalizer coefficient. It has been verified that the approximate energy measurement approach described above results in a suitable approximation of taps energy for the equalizer 110.

From step 308, control returns to step 300 to determine if an unmeasured equalizer coefficient of the particular series remains. If not, then the taps approximate energy measurement technique is completed in step 302. Until the tap energy for each equalizer coefficient is approximately measured, this approximate energy measurement technique cycles through steps 300–308.

Returning to FIG. 2, in step 204, the tap with the highest approximate energy (i.e., the main tap) is located and stored. Next, in step 206, a main tap threshold is calculated. This calculation is represented by the main tap threshold calculation technique shown in FIG. 4. The taps are arranged in a time index ordered sequence. Referring to FIG. 4, beginning in step 400, tap energy for a beginning set of taps in the time index ordered sequence is summed to generate a first energy sum. In step 402, tap energy for a last set of taps in the time index ordered sequence is summed to generate a second energy sum. For example, the equalizer 110 may contain forty taps. The beginning set of taps can be the first five taps, and the last set of taps can be the last five taps.

In step 404, it is determined if the first energy sum is less than the second energy sum. In the subsequent step, the lesser energy sum between the first energy sum and second energy sum is designated as a main tap threshold. That is, if it is determined in step 404 that the first energy sum is less than the second energy sum, then the first energy sum is designated the main tap threshold in step 406. If it is determined in step 404 that the first energy sum is not less than the second energy sum (i.e., the second energy sum is greater than or equal to the first energy sum), then the second energy sum is designated the main tap threshold in step 408.

The main tap threshold is a value used to determine if the main tap is representative of an energy level for a good train or a false train. From both steps 406 and 408, the main tap threshold calculation technique is completed in step 410. The main tap threshold is in a sense "floating" or adaptive since the main tap threshold is based on a particular set of coefficients. One purpose of the main tap threshold is to define a threshold for comparison to the main tap. It should be understood that there are a variety of ways of calculating a main tap threshold other than the way described above. For example, rather than comparing a first energy sum and a second energy sum, a first energy average for a beginning set of taps can be compared with a second energy average for a last set of taps. The minimum energy average is then multiplied by a particular factor (e.g., the number of coefficients used to determine each energy average). That product can serve as a main tap threshold. Thus, it should be apparent that the steps set forth in FIG. 4 can easily be substituted by equivalent mathematical operations.

Returning to FIG. 2, in step 208, the main tap threshold is compared to a predetermined guarding threshold to determine if the main tap threshold is greater than the guarding threshold. The guarding threshold represents a minimum energy level for a main tap. The guarding threshold is predetermined in the sense that the threshold is determined experimentally through testing, as opposed to being determined through software. More particularly, for each popular testing line, with or without external tone tampering or signal dropout, equalizer coefficients are captured for a number of good trains and false trains. If there is no external tone tampering or signal dropout, then a train is good. The coefficients are then plotted. By comparing plots of false trains and plots of good trains, multiple average main tap thresholds are determined. The minimum threshold of the multiple average main tap thresholds will be the main energy level that tends to differentiate good trains from false trains. That minimum average main tap threshold is used as the guarding threshold to exclude the cases where the main tap threshold fails to detect false training. Such a guarding threshold is effective for most popular testing lines (e.g., flat line, Seg-3000 line, JPN1–JPN7 lines, or European lines). It should be understood that if different types of training sequences are to be used for a testing line, then a guarding threshold should be determined for each type of training sequence (e.g., 4-point sequence and 16-point sequence). A different guarding threshold is therefore used if there is a change in the training sequence. For each training sequence, a minimum average main tap threshold is determined for use as a guarding threshold. The modem M is configured to select a particular guarding threshold based on the particular sequence.

If the main tap threshold is greater than the guarding threshold, then control proceeds to step 210. In step 210, the main tap is compared with the main tap threshold, and the result is stored. If the main tap is greater than the main tap threshold, then the train of the equalizer 110 is good. If the main tap is less than the main tap threshold, then the train of the equalizer 110 is false.

If the main tap threshold is less than the guarding threshold, then control proceeds to step 212. In step 212, the guarding threshold is compared with the main tap. In this way, the guarding threshold in effect serves as the main tap threshold when the main tap threshold is below the guarding threshold. The result of the comparison between the guarding threshold and the main tap is stored. If the main tap is greater than the guarding threshold, then the train of the equalizer 110 is good. If the main tap is less than the guarding threshold, then the train of the equalizer 110 is false. From steps 210 and 212, the equalization training validation technique is completed in step 214.

Figure 5:
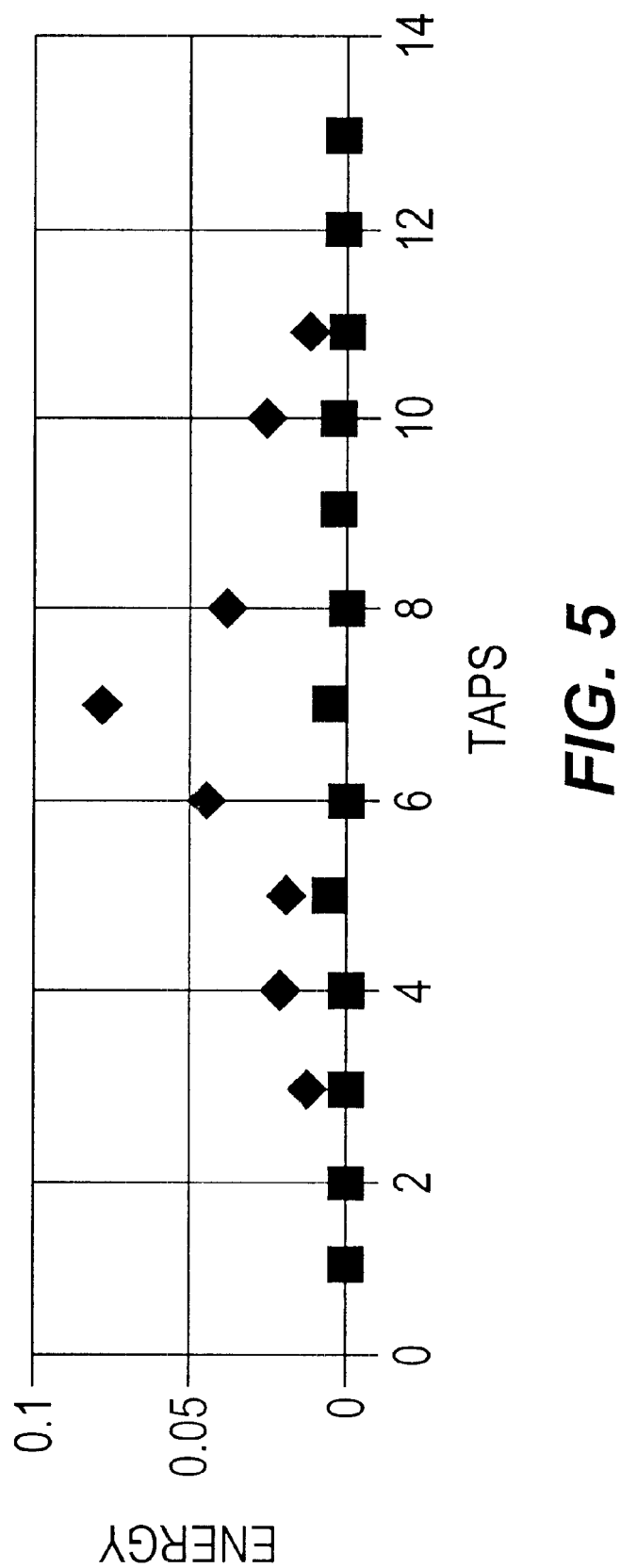
FIG. 5 is an energy plot of exemplary equalizer taps associated with the equalizer of FIG. 1 for good training and false training.

Referring to FIG. 5, an energy plot representing an exemplary good-training taps energy distribution and a false-training taps energy distribution for the equalizer 110 and particular testing line is shown. At the outset, it should be understood that the taps energy distributions, number of taps, main tap location, and energy range depicted in FIG. 5 are only illustrative. For this example, the particular equalizer 110 includes 13 equalizer taps. Accordingly, the horizontal axis of the plot runs from a time index of taps from tap 1 to tap 13. The vertical or energy axis runs from 0 to 1 normalized energy units. The good-training taps energy distribution is represented by diamond symbols, and the false-training taps energy distribution is represented by square symbols. However, where the two distributions overlap, only a square symbol is shown. The good-training taps energy distribution is characterized by a relatively high energy peak at tap 7. In this case, the high energy peak, which corresponds to the main tap of the energy distribution, is part of a "turtle-back" like characteristic. In contrast, the false-training taps energy distribution has a flat-looking, low-energy characteristic. Also, the false-training taps energy distribution is spread across more equalizer taps than the good-training taps energy distribution. For this example, the two energy distributions overlap at taps 1, 2, 9, 12 and 13. That overlap is represented only by a square at each of those taps. Since the main tap is at a relatively high energy level (approximately 0.75) compared to the other taps, it should be appreciated that locating the main tap of a taps energy distribution can be helpful to differentiating a false train from a good train. The location of a main tap of a good-training energy distribution can differ with various types of testing lines. It should be understood that a good-training energy distribution is characterized by one or more relatively high-energy peaks.

Thus, the equalizer training validation techniques involve calculating approximate taps energy for coefficients of an equalizer, locating the main tap, determining a main tap threshold for the taps-energy distribution, and comparing the main tap threshold or the guarding threshold with the main tap to determine if the associated train is good or false. When the selected minimum energy sum is too low, the predetermined guarding threshold is used in place of the main tap threshold. The technique is effective to recognize unique time domain energy shaping characteristics of good-trained equalizer taps. It should be understood that the disclosed equalizer training validation technique is illustrative and not exhaustive. Other ways of using approximate taps energy to differentiate good training and false training are possible without detracting from the spirit of the invention are possible. Likewise, other ways of detecting an energy distribution with a main tap without detracting from the spirit of the invention are possible. It should be understood that the equalization training validation technique is applicable to any equalization scheme.

The disclosed equalizer training validation techniques have significant practicable application. With conventional techniques, false equalizer training is not as readily and effectively detected, if at all. Since false equalizer training is a real concern with equalizers and the communication devices that support equalizers, these equalizer training validation techniques can be applied in a number of useful and concrete ways. In addition, the equalizer training validation techniques can be implemented without increased complexity for most equalizer training implementations and are neutral in impact on current equalizer training standards.

We claim:

1. A modem configured to validate equalizer training, comprising:
   a host controller; and
   a data pump coupled to the host controller, the data pump comprising:
      an equalizer; and
      a memory device coupled to the equalizer, the memory device comprising:
         equalizer training validation code executable by the data pump, the code comprising:
            energy measurement code to approximately measure the energy for each tap of a plurality of taps for the equalizer;
            main tap detection code to detect a main tap with a highest approximate energy, the plurality of taps including the main tap;
            main tap threshold calculation code to calculate a main tap threshold;
            main tap threshold analysis code to compare the main tap threshold with a predetermined guarding threshold; and
            main tap compare code to compare the main tap threshold and the main tap if the main tap threshold is greater than the predetermined guarding threshold and to compare the predetermined guarding threshold and the main tap if the main tap threshold is less than the predetermined guarding threshold.

2. The modem of claim 1, the main tap threshold calculation code, comprising:
   first energy summation code to calculate a first energy sum for a beginning set of taps from the plurality of taps;
   second energy summation code to calculate a second energy sum for a last set of taps from the plurality of taps;
   energy sum compare code to compare the first energy sum and the second energy sum; and
   main tap threshold identification code to treat the first energy sum as the main tap threshold if the first energy sum is less than the second energy sum and to treat the second energy sum as the main tap threshold if the second energy sum is less than the first energy sum.

3. The modem of claim 1, the energy measurement code, comprising:
   code to approximate the energy of each tap of the plurality of taps by summing a magnitude of a real component and a magnitude of an imaginary component of each equalizer coefficient corresponding to each tap.

4. The modem of claim 1, wherein the equalizer comprises a V.34 half-duplex equalizer.

5. The modem of claim 1, wherein if the main tap is compared to the main tap threshold and the predetermined guarding threshold and the main tap is greater than the main tap threshold and the predetermined guarding threshold, then the equalizer corresponds to a good train, and if the main tap is less than the main tap threshold or the predetermined guarding threshold, then the equalizer corresponds to a false train.

6. An integrated circuit, comprising:
   a memory device executable by a data pump, comprising:
      equalizer training validation code, comprising:
         energy measurement code to approximately measure the energy for each tap of a plurality of taps for the equalizer;
         main tap detection code to detect a main tap with a highest approximate energy, the plurality of taps including the main tap;
         main tap threshold calculation code to calculate a main tap threshold; and
         main tap threshold analysis code to compare the main tap threshold with a predetermined guarding threshold; and
         main tap compare code to compare the main tap threshold and the main tap if the main tap threshold is greater than the predetermined guarding threshold and to compare the predetermined guarding threshold and the main tap if the main tap threshold is less than the predetermined guarding threshold.

7. The integrated circuit of claim 6, the main tap threshold calculation code, comprising:
   first energy summation code to calculate a first energy sum for a beginning set of taps from the plurality of taps;
   second energy summation code to calculate a second energy sum for a last set of taps from the plurality of taps;
   energy sum compare code to compare the first energy sum and the second energy sum; and
   main tap threshold identification code to treat the first energy sum as the main tap threshold if the first energy sum is less than the second energy sum and to treat the second energy sum as the main tap threshold if the second energy sum is less than the first energy sum.

8. The integrated circuit of claim 6, the energy measurement code, comprising:
   code to approximate the energy of each tap of the plurality of taps by summing a magnitude of a real component and a magnitude of an imaginary component of each equalizer coefficient corresponding to each tap.

9. The integrated circuit of claim 6, wherein if the main tap is compared to the main tap threshold and the predetermined guarding threshold and the main tap is greater than the main tap threshold and the predetermined guarding threshold, then the equalizer corresponds to a good train, and if the main tap is less than the main tap threshold or the predetermined guarding threshold, then the equalizer corresponds to a false train.

10. The integrated circuit of claim 6, further comprising:
    an equalizer coupled to the memory device.

11. A method of validating equalizer training, comprising the steps of:
    approximately measuring the energy for each tap of a plurality of taps for an equalizer;
    detecting a main tap with a highest approximate energy, the plurality of taps including the main tap;
    calculating a main tap threshold;
    comparing the main tap threshold with a predetermined guarding threshold;
    comparing the main tap and the main tap threshold if the main tap threshold is greater than the predetermine guarding threshold; and
    comparing the main tap and the predetermined guarding threshold if the main tap threshold is less than the predetermine guarding threshold.

12. The method of claim 11, the calculating step comprising the steps of:
    calculating a first energy sum for a beginning set of taps from the plurality of taps;

calculating a second energy sum for a last set of taps from the plurality of taps;

comparing the first energy sum and the second energy sum;

treating the first energy sum as the main tap threshold if the first energy sum is less than the second energy sum; and treating the second energy sum as the main tap threshold if the second energy sum is less than the first energy sum.

13. The method of claim 11, the measuring step comprising the step of:

approximating the energy of each tap of the plurality of taps by summing a magnitude of a real component and a magnitude of an imaginary component of each equalizer coefficient corresponding to each tap.

14. The method of claim 11, wherein if the main tap is compared to the main tap threshold and the predetermined guarding threshold and the main tap is greater than the main tap threshold and the predetermined guarding threshold, then the equalizer corresponds to a good train, and if the main tap is less than the main tap threshold or the predetermined guarding threshold, then the equalizer corresponds to a false train.

15. A processor readable medium, comprising:

equalizer training validation code, comprising:

energy measurement code to approximately measure the energy for each tap of a select plurality of taps for the equalizer;

main tap detection code to detect a main tap with a highest approximate energy, the select plurality of taps including the main tap;

main tap threshold calculation code to calculate a main tap threshold;

main tap threshold analysis code to compare the main tap threshold with a predetermined guarding threshold; and main tap compare code to compare the main tap threshold and the main tap if the main tap threshold is greater than the predetermined guarding threshold and to compare the predetermined guarding threshold and the main tap if the main tap threshold is less than the predetermined guarding threshold.

16. The processor readable medium of claim 15, the main tap threshold calculation code, comprising:

first energy summation code to calculate a first energy sum for a beginning set of taps from the select plurality of taps;

second energy summation code to calculate a second energy sum for a last set of taps from the plurality of taps;

energy sum compare code to compare the first energy sum and the second energy sum; and main tap threshold identification code to treat the first energy sum as the main tap threshold if the first energy sum is less than the second energy sum and to treat the second energy sum as the main tap threshold if the second energy sum is less than the first energy sum.

17. The processor readable medium of claim 15, the energy measurement code, comprising:

code to approximate the energy of each tap of the plurality of taps by summing a magnitude of a real component and a magnitude of an imaginary component of each equalizer coefficient corresponding to each tap.

18. The processor readable medium of claim 15, wherein if the main tap is compared to the main tap threshold and the predetermined guarding threshold and the main tap is greater than the main tap threshold and the predetermined guarding threshold, then the equalizer corresponds to a good train, and if the main tap is less than the main tap threshold or the predetermined guarding threshold, then the equalizer corresponds to a false train.

19. An integrated circuit, comprising:

a data pump configured to perform the following steps:

approximately measuring the energy for each tap of a plurality of taps for an equalizer;

detecting a main tap with a highest approximate energy, the plurality of taps including the main tap;

calculating a main tap threshold;

comparing the main tap threshold with a predetermined guarding threshold;

comparing the main tap and the main tap threshold if the main tap threshold is greater than the predetermine guarding threshold; and comparing the main tap and the predetermined guarding threshold if the main tap threshold is less than the predetermine guarding threshold.

20. The integrated circuit of claim 19, the calculating step comprising the steps of:

calculating a first energy sum for a beginning set of taps from the plurality of taps;

calculating a second energy sum for a last set of taps from the plurality of taps;

comparing the first energy sum and the second energy sum;

treating the first energy sum as the main tap threshold if the first energy sum is less than the second energy sum; and treating the second energy sum as the main tap threshold if the second energy sum is less than the first energy sum.

21. The integrated circuit of claim 19, the measuring step comprising the step of:

approximating the energy of each tap of the plurality of taps by summing a magnitude of a real component and a magnitude of an imaginary component of each equalizer coefficient corresponding to each tap.

* * * * *